United States Patent
Hyde et al.

(10) Patent No.: US 9,149,010 B2
(45) Date of Patent: Oct. 6, 2015

(54) HARVESTING AND GRAFTING OF TREES

(71) Applicant: Elwha LLC, Bellevue, WA (US)

(72) Inventors: Roderick A. Hyde, Redmond, WA (US); Muriel Y. Ishikawa, Livermore, CA (US); Robert C. Petroski, Seattle, WA (US); David B. Tuckerman, Lafayette, CA (US); Thomas A. Weaver, San Mateo, CA (US); Victoria Y. H. Wood, Livermore, CA (US); Lowell L. Wood, Jr., Bellevue, WA (US)

(73) Assignee: ELWHA LLC, Bellevue, WA (US)

(*) Notice: Subject to any disclaimer, the term of this patent is extended or adjusted under 35 U.S.C. 154(b) by 0 days.

(21) Appl. No.: 14/069,079

(22) Filed: Oct. 31, 2013

(65) Prior Publication Data
US 2015/0114519 A1    Apr. 30, 2015

(51) Int. Cl.
*A01G 1/00* (2006.01)
*A01G 23/00* (2006.01)
*A01G 3/08* (2006.01)
*A01G 1/06* (2006.01)
*A01G 23/08* (2006.01)

(52) U.S. Cl.
CPC *A01G 23/00* (2013.01); *A01G 1/06* (2013.01); *A01G 3/08* (2013.01); *A01G 23/08* (2013.01)

(58) Field of Classification Search
CPC ....... A01G 17/00; A01G 17/005; A01G 1/06; A01G 2001/065; A01G 3/08; A01G 3/00; A01G 7/06; A01G 23/00; A01G 23/02; A01G 23/04; A01H 4/008

USPC ...................... 47/6–8; 144/4.1, 34.1, 335, 336
See application file for complete search history.

(56) References Cited

U.S. PATENT DOCUMENTS

| | | | |
|---|---|---|---|
| 4,014,132 A * | 3/1977 | Cook | 47/6 |
| 4,127,154 A * | 11/1978 | Kabotoff | 144/4.1 |
| 4,219,059 A | 8/1980 | Albright | |
| 4,412,569 A * | 11/1983 | Barnett et al. | 144/4.1 |
| 4,516,353 A * | 5/1985 | Cummins et al. | 800/315 |
| 7,100,817 B2 | 9/2006 | Leger et al. | |
| 7,263,210 B2 * | 8/2007 | Kummel | 382/110 |
| 2004/0216809 A1 | 11/2004 | Wildey | |
| 2006/0213167 A1 * | 9/2006 | Koselka et al. | 56/10.2 A |

FOREIGN PATENT DOCUMENTS

JP    2006-034220 A    2/2006
WO    WO 03/011011 A2    2/2003

OTHER PUBLICATIONS

PCT International Search Report; International App. No. PCT/US2014/062123; Jan. 19, 2015; pp. 1-3.

* cited by examiner

*Primary Examiner* — Joshua Huson
(74) *Attorney, Agent, or Firm* — Foley & Lardner LLP

(57) ABSTRACT

A tree harvester includes a body and a harvesting system coupled to the body. The tree harvester further includes a control system coupled to the body. The control system is configured to receive data from the harvesting system regarding a characteristic of a harvested tree and control operation of the harvesting system based on the data. The harvesting system is configured to remove an intermediate portion of the harvested tree below a tree crown and graft the tree crown to a tree stump.

32 Claims, 11 Drawing Sheets

HARVESTING AND GRAFTING OF TREES

BACKGROUND

Trees are harvested for a variety of reasons including, for example, the production of pulp, paper, and other wood-based products. Additionally, trees may be harvested to control the growth of forests. If the stumps of harvested trees are not cleared with the harvest, root-system decay and unwanted carbon pollution may occur. To repopulate the forest, tree harvesters practice a variety of techniques, including selective harvesting and replanting. Selective harvesting includes using seed trees, shelterwood cutting, group selection, and single-tree harvesting, with such methods designed to remove only certain trees while the remaining trees are left to spur other tree growth.

SUMMARY

One embodiment relates to a tree harvester comprising a body; a harvesting system coupled to the body and configured to: remove an intermediate portion of a harvested tree below a tree crown and graft the tree crown to a tree stump; and a control system coupled to the body and configured to: receive data from the harvesting system regarding a characteristic of the harvested tree and control operation of the harvesting system based on the data.

Another embodiment relates to a tree harvester comprising a body; a harvesting system coupled to the body; a control system coupled to the body and configured to: receive data from the harvesting system regarding a characteristic of a harvested tree and control operation of the harvesting system based on the data; wherein the harvesting system is configured to: support a crown of the harvested tree, remove an intermediate portion of the harvested tree below the crown, and connect a vascular cambium of the crown to a vascular cambium of a tree stump using an insert while supporting the crown.

Still another embodiment relates to a tree harvester comprising a body; a harvesting system coupled to the body; a control system coupled to the body and configured to: receive data from the harvesting system regarding a characteristic of a harvested tree and control operation of the harvesting system based on the data; wherein the harvesting system is configured to: remove an intermediate portion of the harvested tree below a tree crown, use a shaper to modify the shape of at least one of the tree crown and a tree stump, and graft the tree crown to the tree stump.

Yet another embodiment relates to a method of harvesting trees, the method comprising: acquiring data regarding a plurality of trees; selecting one of the plurality of trees based on the data; removing an intermediate portion of the selected tree between a crown and a stump; aligning the crown and the stump; and grafting the crown to the stump.

A further embodiment relates to a method of grafting a crown to a stump after harvesting an intermediate portion of a tree, the method comprising: acquiring data about the crown and stump; determining whether the crown and stump are compatible based on the data; modifying at least one of the crown and stump using a shaper; and grafting the crown to the stump.

Another embodiment relates to a method of grafting trees, the method comprising: acquiring data regarding a plurality of trees; selecting one of the plurality of trees based on the data; removing an intermediate portion of the tree between a crown and a stump; identifying a compatible stump suitable for grafting with the crown; and grafting the crown to the compatible stump.

Still another embodiment relates a tree harvesting system, the system comprising: a harvesting system configured to harvest an intermediate portion of a selected tree and to graft a crown of the selected tree with a tree stump; and a control system coupled to the harvesting system, wherein the control system is configured to: receive data regarding a plurality of trees from the harvesting system and identify the selected tree based on the data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
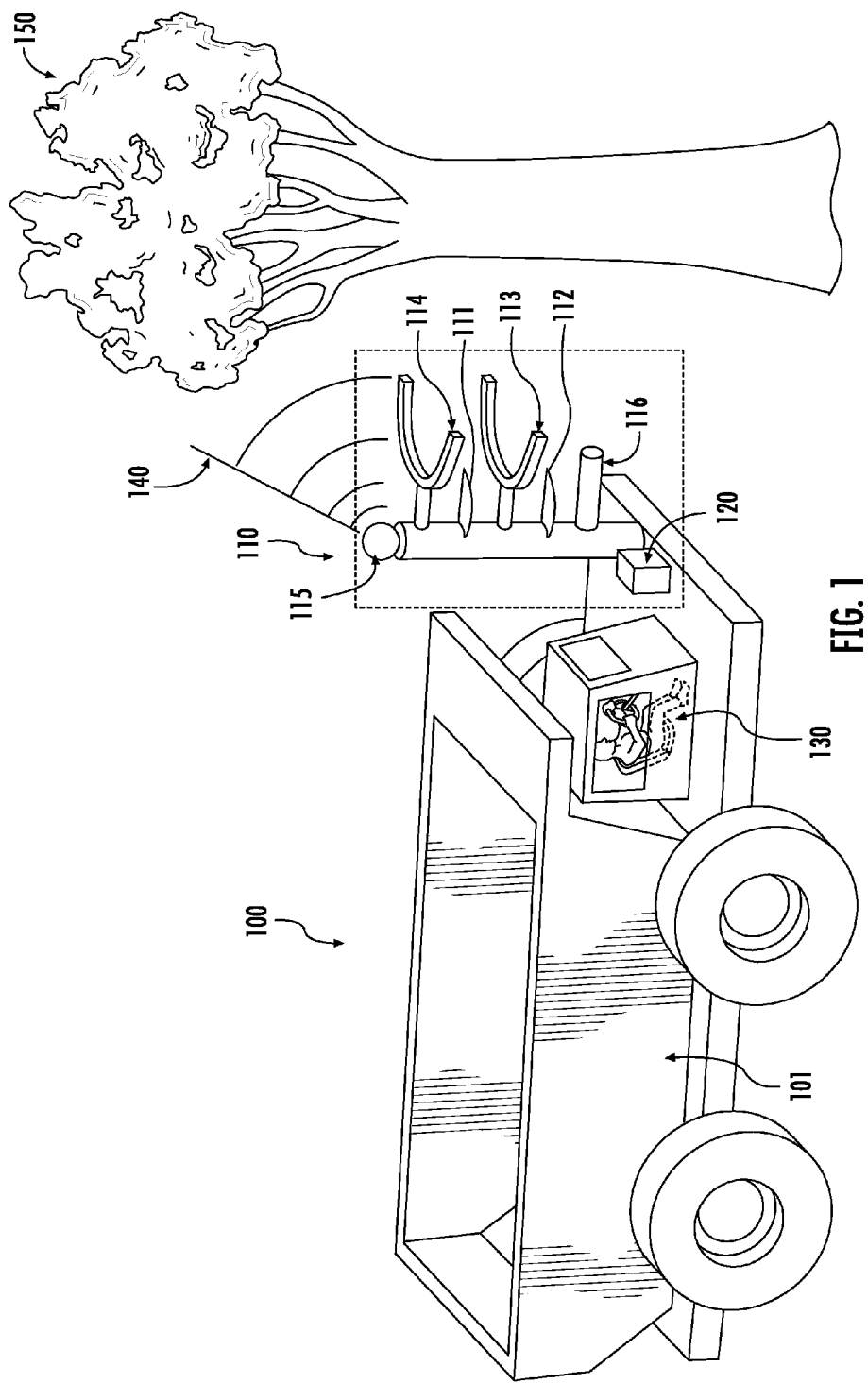
FIG. 1 is an isometric view of a tree harvester and a tree, according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to tree harvesting and/or tree grafting systems. One or more trees may be selected for harvest based on a variety of factors, such as size, location, age, health, foliage area, and the like. A portion of the tree (e.g., an intermediate portion between the top of the tree and the tree stump) is harvested. The intermediate portion may be harvested for a variety of reasons, including to make lumber, wood pellets, paper, and pulp. The top of the tree may then be grafted on to the stump of the tree. Harvesting and grafting in this way may promote faster growth of new trees and avoid unnecessary stump removal operations and/or undesirable carbon pollution resulting from leaving an unused stump in place. As discussed in greater detail below, various techniques may be utilized to select appropriate trees, harvest desired portions of the selected trees, and/or use the remaining (unharvested) portions of the trees to provide newly grafted trees. In some embodiments, the tree harvesting systems include robotic mechanisms configured to automate the harvesting of intermediate portions of trees and the grafting of the remaining portions.

Referring now to FIG. 1, tree harvester 100 is shown according to one embodiment. Tree harvester 100 includes harvesting system 110 and control system 120, both coupled to body 101. Body 101 can be or include a vehicle, such as a truck or similar vehicle. Coupled to control system 120 is sensor 115 configured to acquire information about tree 150 (e.g., by emitting a beam such as a ray or wave, by capturing still and/or video images, etc.). In general, tree harvester 100 is configured to identify one or more trees, harvest a portion of each of the trees, and then graft a remaining top portion of the tree to the remaining stump of the tree (or alternatively, the stump of a different harvested tree that may be more suitable for grafting).

Harvesting system 110 includes first cutter 111 and second cutter 112. First and second cutters 111, 112 are configured to remove a section of tree 150 (e.g., an intermediate portion of tree 150 between a top portion of the tree and the stump of the tree). Harvesting system 110 further includes grabber 114 and loader 113. Grabber 114 is configured to hold the top or crown of tree 150, while loader 113 holds and transports an intermediate portion of tree 150. After loader 113 removes the intermediate portion of tree 150 for harvesting, grabber 114 lowers the crown onto the stump to promote regrowth of the harvested tree. In some alternative embodiments, harvesting system 110 may comprise multiple machines, rather than a single vehicle. For instance, one machine may harvest the intermediate portion of the tree, while another machine performs the grafting of the crown to the stump. In some embodiments, removal of the intermediate portion to a distal facility is performed by a separate machine, rather than by tree harvester 100.

According to various alternative embodiments, sensor 115 may utilize any one or a combination of scanning or data acquisition techniques to determine characteristics of trees to be potentially harvested. For example, sensor 115 can utilize wireless protocols 140, such as electromagnetic waves, three-dimensional scanning, x-rays, video systems, camera systems, microwaves, infrared lasers, lasers, ultrasound, and/or lidar to detect tree 150 and acquire information about tree 150. Sensor 115 can utilize ground penetrating radar to acquire information about root portions of tree 150. The acquired information is then transmitted to control system 120. In an alternative embodiment, sensor 115 can employ sampler 116 (e.g., a core sampler, etc.) to physically take internal and/or external specimens of tree 150. The samples can be analyzed by control system 120 to acquire information about tree 150.

Figure 2:
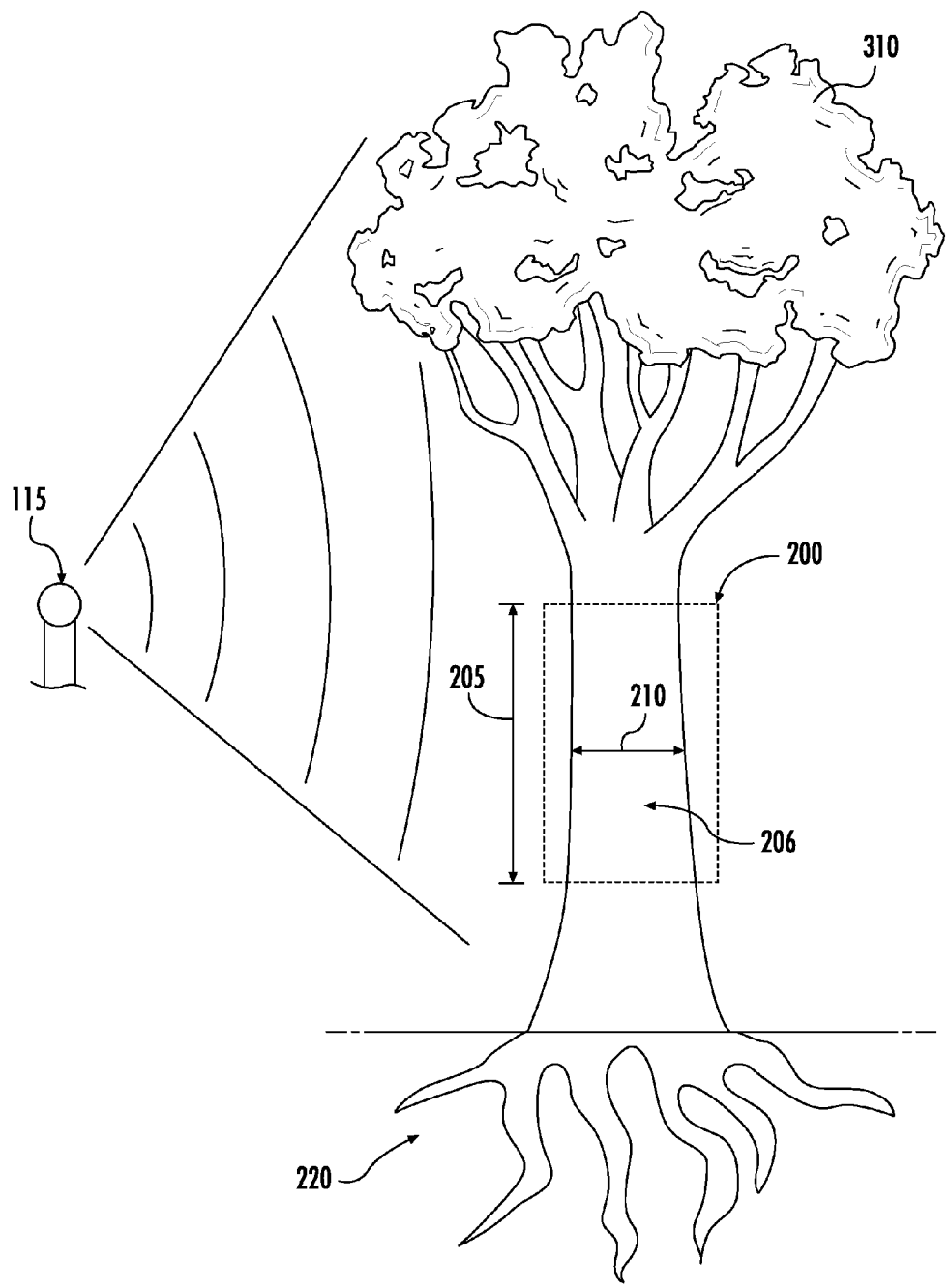
FIG. 2 is a front view of a tree, according to one embodiment.

Referring to FIG. 2, sensor 115 analyzing tree 150 is shown according to one embodiment. Sensor 115 is configured to acquire data pertaining to intermediate portion 200 as well as about the entirety of tree 150. Sensor 115 can detect and transmit various information to control system 120 about intermediate portion 200, including its length 205, diameter 210, and/or volume 206. Sensor 115 is also configured to acquire data pertaining to an indication of at least one of the age and health of tree 150, and in particular, intermediate portion 200. Health data can indicate, among other things, the presence of viruses, bacteria, fungi, and/or the presence or absence of early deterioration of the tree.

Still referring to FIG. 2, sensor 115 can be further configured to acquire information about crown 310 and stump 320 (FIG. 3) of tree 150, including root system 220. Information pertaining to crown 310 can include length, width, occupied planform, an indication of health, presence or absence of healthy leaves, extent of leaf coverage, photosynthetic capture area, an indication of the presence and/or health of the vascular cambia, xylem, and phloem, and combinations of any of these factors. The height of crown 310 can be used by control system 120 to determine solar access of a would-be grafted tree. In addition, information pertaining to root system 220 can include the presence and health of lateral and primary roots, root hairs, root tip, root cap, the beneath ground root-occupied area, an indication of the presence and/or health of the vascular cambia, xylem, and phloem, and combinations of any of these factors. According to various other embodiments, sensor 115 can be configured to acquire various other types of information about tree 150, including, for example, the type and location of tree 150, etc.

Sampler 116 can be configured to acquire any of the information mentioned in regard to sensor 115. Sampler 116 can utilize any one or a combination of appropriate mechanisms to capture information and data regarding tree 150. For example, sampler 116 can utilize a cutter to remove specific specimens of tree 150. Those specimens can then be analyzed. Analysis can take place on tree harvester 100 via control system 120, or in a remote lab. Various types of data, including an indication of the age, type, and health of cambium, xylem, and phloem, can all be extracted from the specimens.

Tree harvester 100 can employ sampler 116 and sensor 115 independently or in some combination to acquire desired data regarding one or more trees such as tree 150. The acquired data, either physical samples from sampler 116 or electronic data from sensor 115, can be subsequently transmitted to control system 120. Based on the data received from sensor 115 and/or sampler 116, various information regarding the tree can then be provided to, for example, operator 130 of tree harvester 100. Operator 130 (who may be on-board tree harvester 100 or remotely controlling it via telemetry) can then determine whether or not to instruct harvesting system 110 to select tree 150 and harvest intermediate portion 200.

In an alternative embodiment, control system 120 is configured to automatically determine whether to select tree 150 for harvesting based on the data acquired by sensor 115 and/or sampler 116 (e.g., by way of an appropriate algorithm, formula, program, etc.). Moreover, depending on the goal of the tree harvesting, tree selection can be based on one or a multitude of characteristics acquired by sensor 115 or sampler 116. For example, intermediate portion 200 may need to be a particular length 205 or diameter 210 to warrant harvesting without regard to characteristics about crown 310, stump 320, and/or root system 220. Alternatively, intermediate portion 200 can be chosen based on a predicted growth capability and/or grafting compatibility of the tree after removal of intermediate portion 200. If the predicted growth capability and/or grafting compatibility of the resulting crown and stump is not satisfactory, the amount of intermediate portion 200 selected may be decreased, increased, or alternatively, the tree may not be selected entirely.

Figure 3:
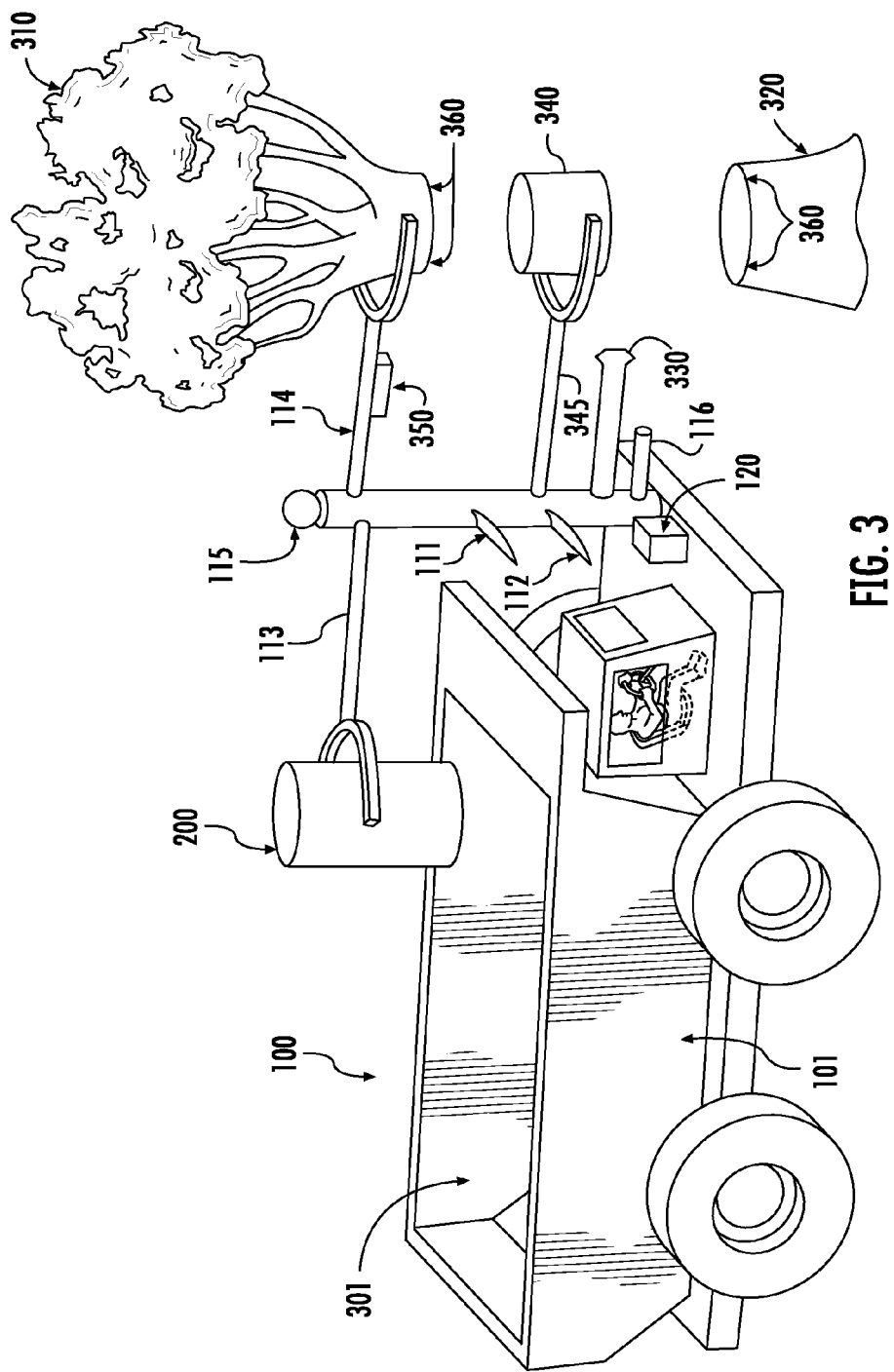
FIG. 3 is an isometric view of a tree harvester with an intermediate portion of a tree harvested, according to one embodiment.

Referring to FIG. 3, tree harvester 100 removing intermediate portion 200 is shown according to one embodiment. After intermediate portion 200 is removed from tree 150, loader 113 transports intermediate portion 200 to storage area 301. Storage area 301 can be/include a flatbed truck, a trailer, an open or enclosed box, etc. Storage area 301 can further include two storage areas, e.g., initial storage on the ground, and then later storage with a flatbed truck, a trailer, an open or enclosed box, etc. According to one embodiment, loader 113 includes adjustable clamps or tongs, adjustable rods, and/or insertable platforms configured to hold and transport intermediate portion 200.

Still referring to FIG. 3, according to one embodiment, first cutter 111 is used to sever intermediate portion 200 from crown 310 of tree 150. Second cutter 112 is used to sever intermediate portion 200 from stump 320. According to another embodiment, cutter 111 may be employed to sever intermediate portion 200 from both crown 310 and stump 320 of tree 150 (e.g., such that only a single cutter is required). Moreover, cutters 111, 112 can include any one of a variety of cutting devices, including shears, knives, saws, drills, hammer and wedge systems, penetrating lasers, etc. Cutters 111 and 112 may be utilized in different orders, i.e., in some embodiments crown 310 is removed while intermediate portion 200 is still connected to tree 150, while in other embodiments, crown 310 and intermediate portion 200 are first severed from stump 320 as a unit, and then later are separated from each other; this latter separation may be performed while they are being held vertical, or while they are horizontal (e.g., resting on the ground). In some embodiments, tree harvester 100 uses a third cutter (or alternatively uses first cutter 111 or second cutter 112) to remove existing branches from intermediate portion 200 (e.g., for more compact storage in storage area 301).

Grabber 114 is configured to hold and transport crown 310 of tree 150 during and/or after removal of intermediate portion 200. According to various alternative embodiments, grabber 114 can include hydraulic, pneumatic, fuel, and/or electronically-powered grabbing devices such as adjustable tongs, adjustable clamps, insertable rods, etc. Grabber 114 is configured to deliver and attach crown 310 onto stump 320 after removal of intermediate portion 200. Thus, the grafting operation is performed in conjunction with (e.g., during or immediately after) the harvesting operation. Attaching crown 310 to stump 320 takes advantage of existing root system 220 and enables sufficient support for a fully developed crown 310. Existing root system 220 and crown 310 may allow for swift regrowth of tree 150, which creates quickly realized future re-harvesting opportunities.

In some embodiments, robotic mechanisms included on tree harvester 100 allow for intermediate portion 200 to be harvested while crown 310 is grafted to stump 320. For example, control system 120 can be configured to provide robotic automation of the aforementioned process (e.g., to provide an autonomous or semi-autonomous harvesting and grafting system). Because harvesting and/or grafting can be done quickly, crown 310 and stump 320 experience limited exposure to potentially harmful environmental conditions, such as bacteria, fungi, germs, and viruses.

Reusing stump 320 and grafting crown 310 onto stump 320 is an eco-friendly endeavor in that there is no root-system decay and/or carbon emission from an otherwise oxidizing stump 320 and crown 310. Moreover, as crown 310 would be of otherwise little economic and commercial value, here, crown 310 is effectively recycled to resurrect the harvested tree. As such, carbon credits may be available due to this lack of carbon generation. The potential for monetary carbon credits may increase the financial appeal of the tree harvesting system disclosed herein.

Successful grafting typically requires bonding of the vascular cambia between the scion (crown) and stock (stump). Traditional methods of grafting include budding, approach, cleft, whip, and stub grafting. Because monocots have vascular bundles and not continuous vascular cambia like dicots, grafting is generally not possible in monocots due to the impossibility of aligning the vascular bundles of monocots. However, the presence of continuous vascular cambia in most dicots often allows for successful grafting. The vascular cambia in dicots is responsible for secondary growth in dicot trees, including production of xylem and phloem, which is in turn responsible for lateral growth, including the formation of bark. Due to needing vascular cambia for successful grafting, tree 150 is typically a member of the dicot family. As such, referring back to FIG. 3, tree 150 is shown having vascular cambia 360 in both crown 310 and stump 320.

Referring further to FIG. 3, according to one embodiment, in order to graft crown 310 to stump 320, control system 120 directs grabber 114 to align vascular cambia 360 of the crown and stump when crown 310 is delivered to stump 320. The location and/or size of vascular cambia 360 in stump 320 and crown 310 can be obtained from sensor 115. As discussed above, sensor 115 may employ wireless protocols 140 (FIG. 1) or sampler 116 to determine the precise location of vascular cambia 360 and transmit the location to control system 120. In some embodiments, sensor 115 acquires information regarding the location and/or size of vascular cambia 360 from inspection of the exposed surfaces of crown 310 and stump 320 following removal of intermediate portion 200. Control of grabber 114 (lower, left, right, tilt, etc.) can then be automated via control system 120.

Figure 4:
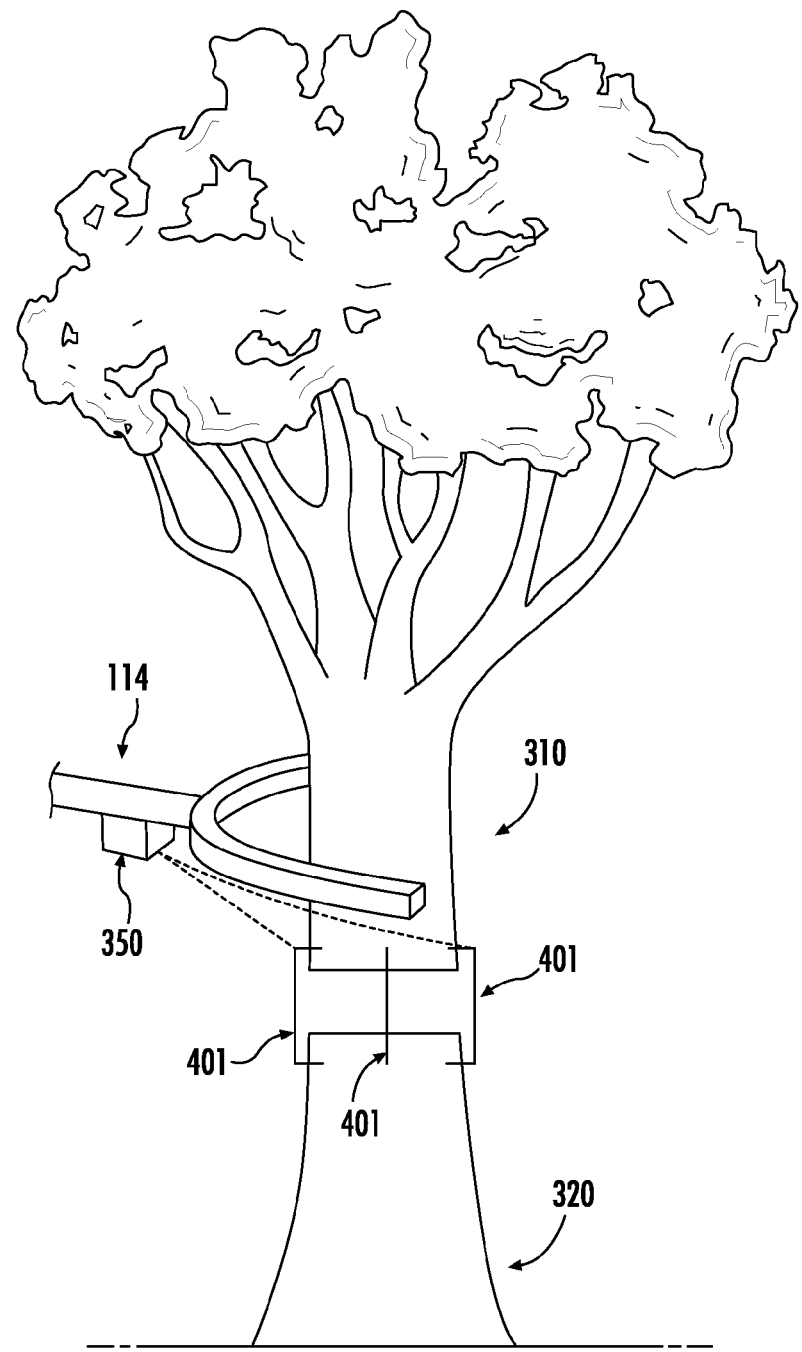
FIG. 4 is a front view of a fastener securing the crown to the stump, according to one embodiment.

According to another embodiment shown in FIG. 4, harvesting system 110 includes coupling mechanism 350. Coupling mechanism 350 is configured to utilize at least one fastener 401. After grabber 114 places crown 310 on or near stump 320, coupling mechanism 350 uses/inserts fastener 401 to secure crown 310 to stump 320, such that crown 310 can be directed parallel to existing stump 320 growth. According to another embodiment, crown 310 can be secured to stump 320 in a particular orientation to promote a desired tree regrowth direction.

Fastener 401 can include dowels, pegs, screws, spikes, and/or bolts configured to be inserted into crown 310 and stump 320. In some embodiments, fastener 401 can be or include one or more clamps fastened circumferentially to both crown 310 and stump 320; and/or scaffolding configured to securely hold crown 310 to stump 320. In some embodiments, harvesting system 110 is configured to apply health promoting materials (e.g., antibacterial or antifungal treatments) to the stump and/or crown surfaces before they are grafted together. In some embodiments, harvesting system 110 is configured to apply a dressing or a sealant around exposed portions of the crown-stump joint to protect against invasion of foreign organisms.

Figure 5A:
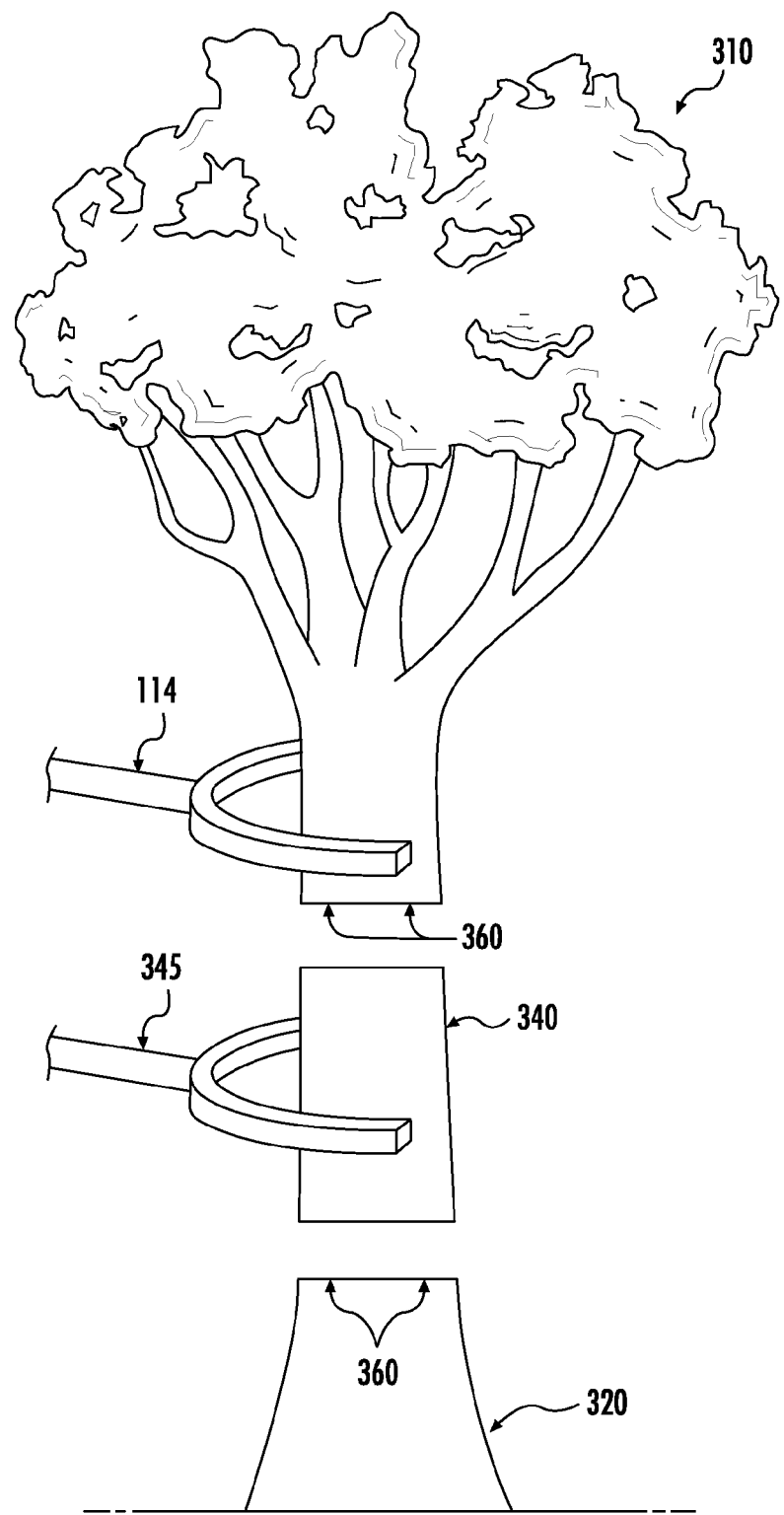
FIG. 5A is a front view of an insert connecting the vascular cambium of the crown with that of the stump, according to one embodiment.

Referring to FIGS. 3 and 5A, according to one embodiment shown, harvesting system 110 includes implanter 345 configured to use one or more inserts 340. Inserts 340 are configured to be implanted via implanter 345 between crown 310 and stump 320, and to connect the vascular cambia 360 between crown 310 and stump 320. Multiple inserts 340 are capable of being stored on harvester 100 and, therefore, being implanted to graft numerous crowns-to-stumps. Furthermore, stored inserts 340 can be of varying sizes to account for mismatching vascular cambia of crown 310 and stump 320.

Figure 5B:
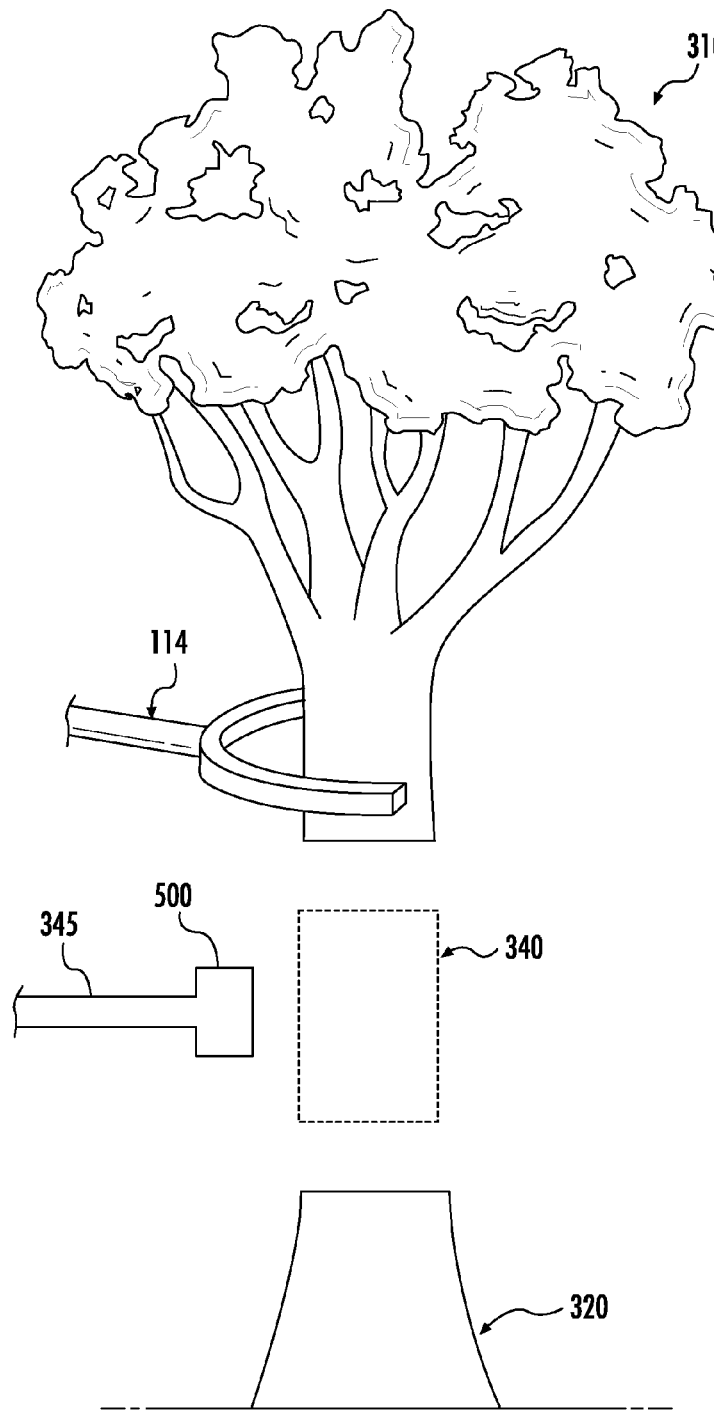
FIG. 5B is a front view of an insert connecting the vascular cambium of the crown with the vascular cambium of the stump, according to one embodiment.

In some embodiments, inserts 340 can be a three-dimensional printout of artificial vascular cambia, recycled vascular cambia from compatible trees, and/or artificial or non-artificial cells that produce vascular cambia. For example, referring to FIG. 5B, implanter 345 can be coupled to generator

500. Generator 500 is configured to produce or at least partially produce insert 340 (e.g., by using a three-dimensional printer), such that insert 340 can be configured to bond to vascular cambia 360 of crown 310 and stump 320. Generator 500 can produce insert 340 while grabber 114 is holding crown 310 above stump 320. Alternatively, generator 500 can produce insert 340 before intermediate portion 200 is harvested, using pre-harvesting sensor information (e.g., crown and stump diameters, size and location of vascular cambia, etc.). After production of insert 340, insert 340 is inserted between crown 310 and stump 320. Grabber 114 then lowers crown 310 onto stump 320 and the generated insert 340 bonds with vascular cambia 360 of crown 310 and stump 320. Control system 120 can be configured to automate generation of insert 340 to insure a sufficient deposit for crown-to-stump grafting. As such, mismatching vascular cambia of crown 310 and stump 320 can still be grafted without the need for surgical reconfiguration of one or both of crown 310 and stump 320.

Referring back to FIG. 3, in some embodiments harvesting system 110 includes shaper 330 configured to modify the shape of at least one of crown 310 and stump 320 such that the vascular cambia 360 of crown 310 and stump 320 overlap, or are aligned, when grabber 114 lowers crown 310 onto stump 320. According to one embodiment, shaper 330 removes an interior part (e.g., a cross-section) of at least one of crown 310 and stump 320. The removed portion can be cylindrical, conical, wedge, annular, and/or rectangular shaped. Additionally, the removed portion can be tapered, such that crown 310 and stump 320 are more likely to align and overlap. In some embodiments, material is removed from stump 320 and/or crown 310 to allow for stretching or compacting as described below. In some embodiments, complementary material is removed from both stump 320 and crown 310 in order to reshape their interfacial surface; for instance a concave depression may be made in the surface of stump 320, while exterior portions of the crown surface are removed to form a matching protrusion. Alternatively a depression may be formed in crown 310 and a matching protrusion in stump 320. According to various alternative embodiments, shaper 330 can include hydraulic, pneumatic, and/or electric chisels, drills, saws, axes, a mill, picks, and/or a material-removing laser. Shaper 330 can be controlled by operator 130 or automated via control system 120.

Figure 6A:
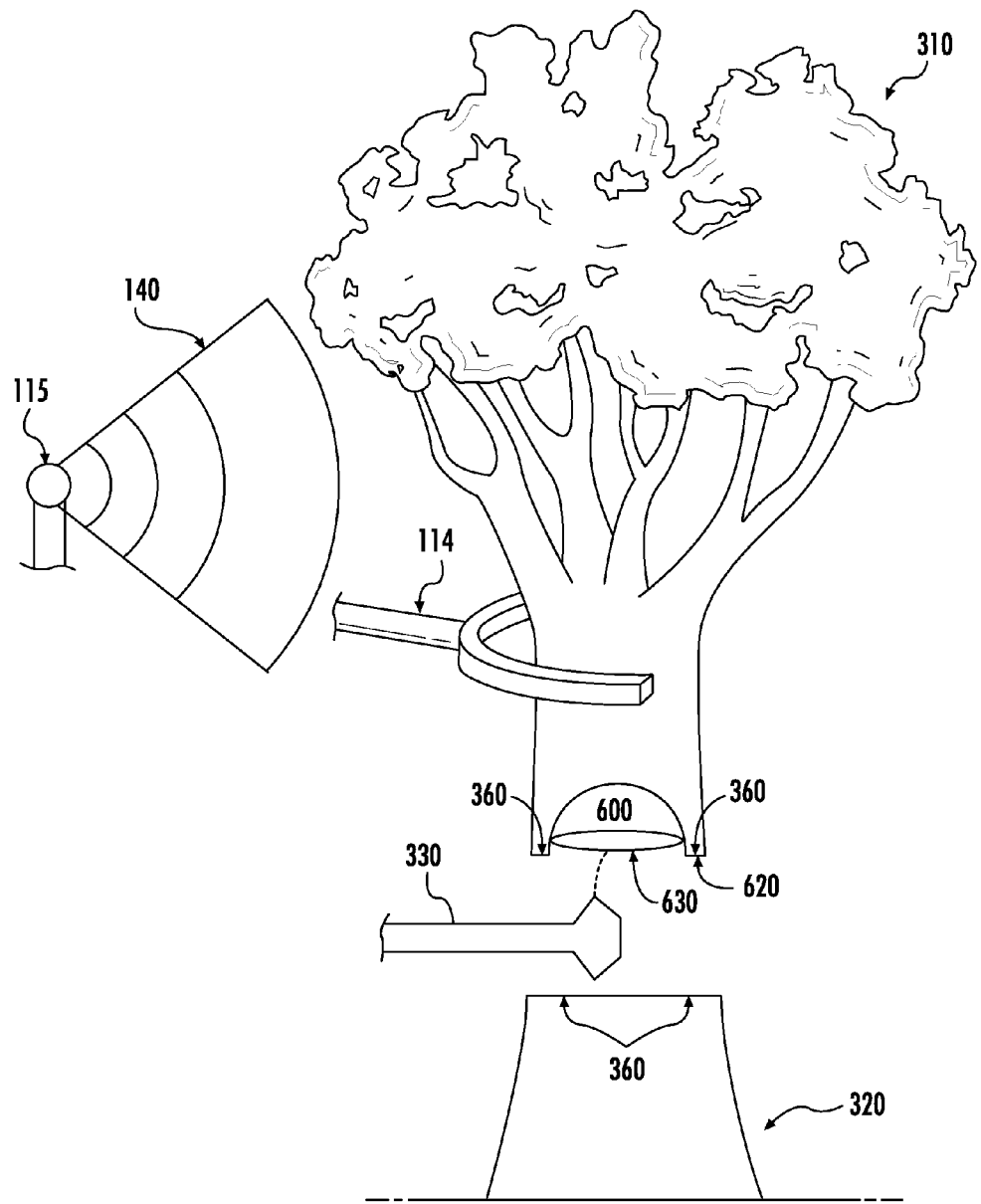
FIG. 6A is a front view of a crown with a section removed and a stretcher, according to one embodiment.

Referring to FIG. 6A, tree 150 with section 600 removed by shaper 330 is shown according to one embodiment. Removing section 600 and determining the size and volume of section 600 to remove can be partially or completely automated/robotic via, for example, control system 120 (e.g., based on data acquired by sensor 115 and/or by sampler 116, etc.), or alternatively, manual by operator 130. In addition to removing section 600, shaper 330 can also taper edges 620. Tapered edges 620 allow for flush alignment between crown 310 and stump 320.

According to another embodiment, harvesting system 110 can be configured to utilize a stretcher 630 (FIG. 6A). After section 600 is removed, stretcher 630 can be inserted into crown 310 where section 600 was removed (see FIG. 6A; shaper 330 is removed and stretcher 630 is placed inside of crown 310). In one embodiment, stretcher 630 can be configured to be inserted by shaper 330 in section 600. In another embodiment, stretcher 630 can be inserted in section 600 by any other component of tree harvester 100. Stretcher 630 is configured to increase the diameter of crown 310. Insertion of stretcher 630 can be completely automated/robotic, or controlled manually by operator 130. Increasing the diameter of crown 310 also increases the diameter of the crown's vascular cambium, thereby helping to align the vascular cambia 360 of crown 310 with stump 320. In some embodiments, a protrusion may be formed in the stump surface, matching the post-stretching shape of the cavity formed following the removal of section 600 from the crown. Stretcher 630 can be or include a spring, an expandable rod, an expandable ring, a pressurized fluid, and/or an expandable cone. Stretcher 630 can be electric, hydraulic, and/or pneumatically driven, with power coming from the tree harvester or from an unconnected and/or remote power source. Stretcher 630 is capable of being controlled by an operator or automated/robotically controlled by control system 120 according to various alternative embodiments.

Figure 6B:
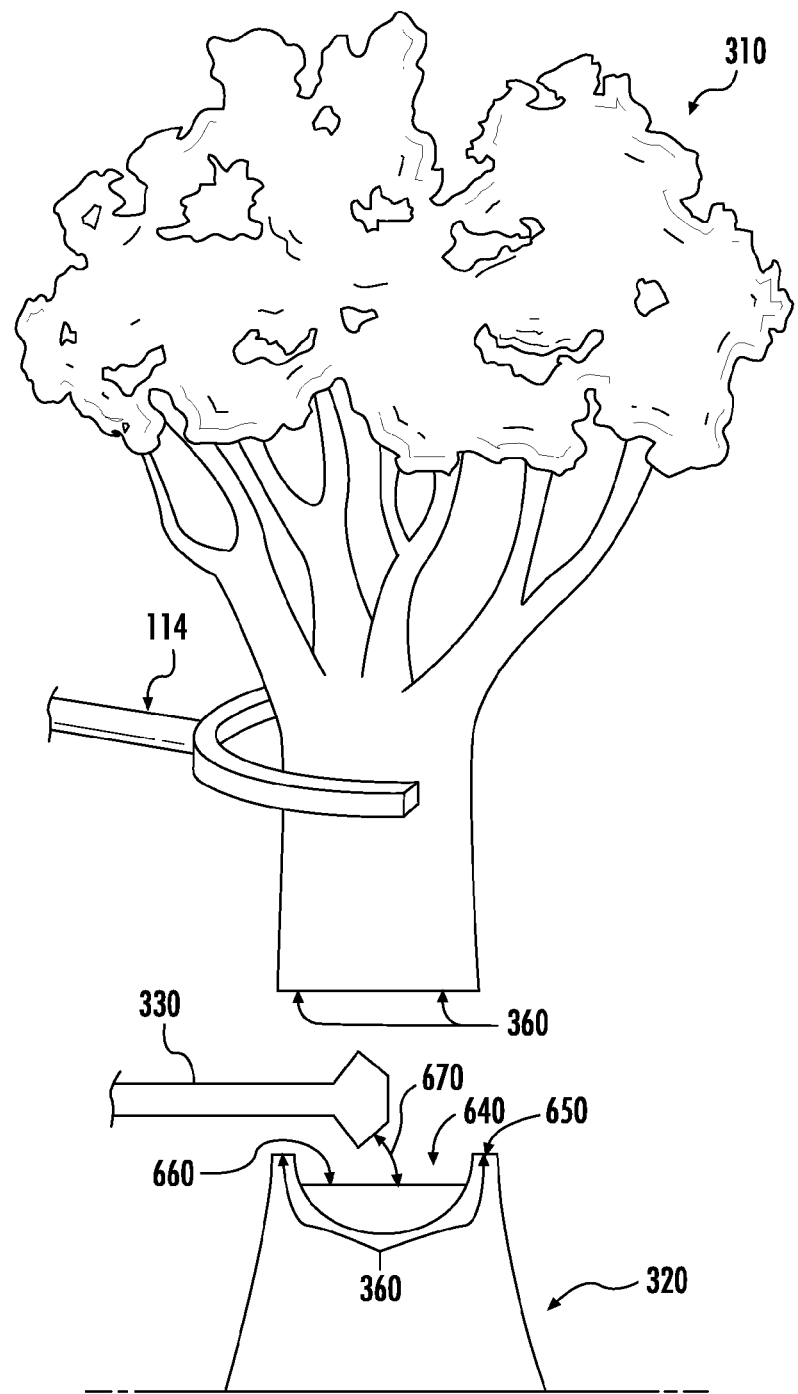
FIG. 6B is a front view of a stump with a portion removed and a compactor, according to one embodiment.

Referring to FIG. 6B, tree 150 with portion 640 of stump 320 removed by shaper 330 is shown according to one embodiment. In addition to tapering edges of crown 310, shaper 330 can also be configured to taper edges 650 of stump 320 to lie flush with crown 310. According to one embodiment, harvesting system 110 can utilize compactor 660. In one embodiment, after portion 640 is removed from stump 320, compactor 660 is inserted into stump 320. In this embodiment, shaper 330 inserts compactor 660 into stump (see FIG. 6B where compactor 660 is shown in stump 320 and line 670 shows the travel of shaper 330). In another embodiment, compactor 660 can be inserted by any other component of tree harvester 100. Compactor 660 is configured to decrease the diameter of stump 320. Decreasing the diameter of stump 320 aids in aligning vascular cambia 360 of stump 320 and crown 310. In some embodiments, a protrusion may be formed in the crown surface, matching the post-compaction shape of the cavity formed following the removal of section 640 from the stump. In some embodiments, the shape of removed portion 640 is selected so as to not leave a substantial post-compaction cavity in stump 320 (e.g., by removing annular regions corresponding to the difference between an initial cylindrical shape and a post-compaction conical frustum). Compactor 660 can be or include a belt, a pressurized fluid, and/or a collapsible ring configured to fit around the stump 320 and "squeeze" the stump decrease the diameter. Compactor 660 can also be an insertable rod, configured to pull the stump inward, thereby decreasing its diameter. Compactor 660 can also include an adjustable clamp or tongs. The adjustable clamp and/or tongs can be manual, pneumatic, hydraulic, and/or electrically powered. Power can come from the tree harvester directly or from an unconnected and/or remote power source. Compactor 660 is capable of being controlled by an operator or automated/robotically controlled by control system 120 according to various alternative embodiments.

In some embodiments, shaper 330 removes at least one of portion 640 and section 630 in order to align vascular cambia 360 of crown 310 and stump 320. Moreover, while stretcher 630 is shown in FIG. 6A as being used in connection with crown 310, in various other embodiments, stretcher 630 can also be applied to stump 320. Additionally, stretcher 630 can attach to the outside of crown 310 and/or stump 320. Similarly, while compactor 660 is shown in FIG. 6B as being used in connection with stump 320, in various other embodiments, compactor 660 can also be applied to crown 310 (either on the outside of crown 310 or in the interior where section 630 was removed).

According to alternative embodiments, control system 120 can control the deployment and/or use of stretcher 630 and/or compactor 660. As described above, sensor 115 employs wireless protocols 140 or sampler 116 to acquire data about the location of the vascular cambia in crown 310 and stump 320. The location data is then transmitted to control system 120 such that control system 120 or operator 130 can determine whether to use shaper 330 on crown 310 and/or stump 320, and whether to use stretcher 630 and/or compactor 660. For example, sensor 115 may provide real-time video to operator 130 regarding how much material has been removed by shaper 330 to allow for real-time review and control. In the alternative, these decisions can be completely automated/robotic by control system 120 (e.g., by a computer analysis of tree-related data captured by sensor 115).

Figure 7:
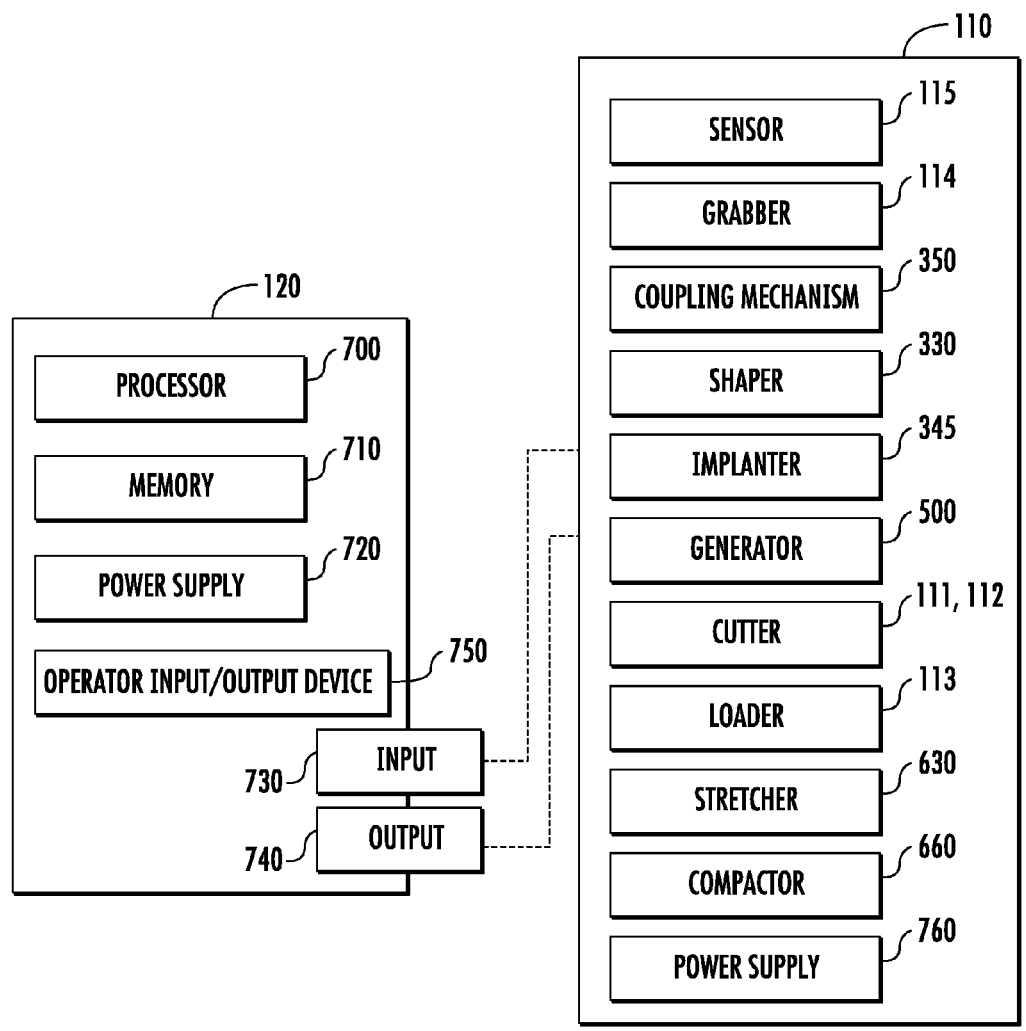
FIG. 7 is a diagram of a control system connected to a harvesting system, according to one embodiment.

Referring to FIG. 7, control system 120 in communication and coupled with harvesting system 110 is shown according to one embodiment. Control system 120 includes processor 700, memory 710, power supply 720, input 730, output 740, and operator input/output device 750. Operator input/output device 750 is configured to allow an operator to input his/her commands into control system 120 (e.g., via computer display touchscreen, or a smartphone, etc.). In an alternative embodiment, robotic control of harvesting system 110 is accomplished via processor 700 of control system 120. Input 730 is configured to receive information acquired by harvesting system 110 (e.g., information regarding one or more trees) and/or other remote devices. Output 740 is configured to transmit commands (e.g., control signals, etc.) from control system 120 to harvesting system 110 (e.g., to initiate harvesting and/or grafting of one or more trees).

Power supply 720 provides power to control system 120. Power supply 720 may receive power from any suitable source (e.g., rechargeable battery, non-rechargeable battery, etc.). Power supply 720 may also receive power through wireless inductive power, by converting mechanical energy present from operation of tree harvester into electrical energy, from solar cells, and/or through photovoltaic cells, etc.

Operator input/output device 750 can receive data from an operator. The data can include desired tree characteristics, such as minimum/maximum volume, diameter, and height of intermediate section; photosynthetic capture of the crown; health of tree, including presence or absence of harmful bacteria, viruses, and fungi, age of tree, health of root-system, coverage area of root-system location of tree in regard to solar accessibility, type of tree, etc. Based on these characteristics, control system 120 can operate sensor 115 to acquire such data. After this data is acquired, it is then received via input 730 and can be stored in memory 710. Processor 700 then determines, based on the acquired data, whether to select such a tree for harvesting. In an alternative embodiment, the data is transmitted back to the operator such that the operator can select whether to harvest the tree based on the data. Operator input/output device 750 can also be configured to display the data to the operator, such that the operator can input commands based on the data (e.g., select tree for harvesting).

Assuming processor 700 or, in the alternative embodiment, the operator determines to harvest a particular tree, harvesting system 110 is controlled to do so via output 740 of control system 120. Harvesting system 120 can utilize on or more of sensor 115, grabber 114, coupling mechanism 350, shaper 330, implanter 345 with insert 340 (alternatively, generator 500 that produces insert 340), cutters 111 and 112, loader 113, stretcher 630, and compactor 660 to harvest and/or graft the tree and tree portions In one embodiment, power supply 760 is included in harvesting system 110, such that power supply 760 is configured to power the components and sub-components of harvesting system 110. In an alternative embodiment, power supply 720 of control system 120 can provide some or all of the required power to harvesting system 110 (e.g., via, in addition to, or instead of, power supply 760). Power supply 760 can receive power from any suitable source, including conversion of mechanical energy to electrical energy from operation of the tree harvester, photovoltaic cells included in the tree harvester, chargeable and/or non-rechargeable batteries included in the tree harvester, solar cells included on the tree harvester, etc. Power supply 760 and/or power supply 720 are capable of providing suitable electric, hydraulic, and pneumatic power to operate the various components and sub-components of harvesting system 110.

Sensor 115, grabber 114, coupling mechanism 350, shaper 330, implanter 345 with insert 340 (alternatively, generator 500 that produces insert 340), cutters 111 and 112, loader 113, stretcher 630, and compactor 660 are controllable based on various inputs to the harvesting system. For example, based on the data acquired by sensor 115, processor 700 determines whether to select a tree for harvesting, what type of and when to employ insert 401, or, whether and how shaper 330 should be used on the remaining crown and stump of the tree. Determining if, when, and how to employ grabber 114, coupling mechanism 350, shaper 330, implanter 345 with insert 340 (alternatively, generator 500), cutters 111 and 112, loader 113, stretcher 630, and/or compactor 660 can be semi- or completely automated/robotic, or alternatively, can be partially or wholly operator controlled via operator input/output device 750.

Figure 8:
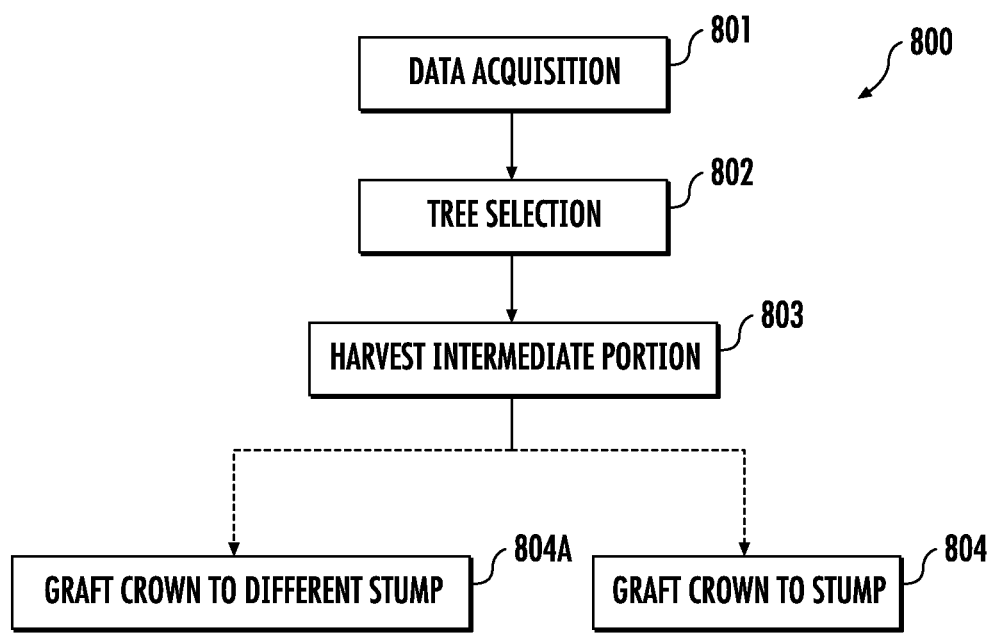
FIG. 8 is a flow diagram illustrating a method of tree harvesting, according to one embodiment.

Referring now to FIG. 8, method 800 for harvesting intermediate portions of trees is shown according to one embodiment. Data regarding one or more trees is acquired using a sensor (801). Sensors can include x-ray, video cameras, microwave, laser, ultrasonic, and lidar devices, transmitters, transceivers, etc. As discussed above, the data acquired may include minimum/maximum volume, diameter, and height of intermediate section; photosynthetic capture of the crown; an indication of the health of tree, including presence or absence of harmful bacteria, viruses, and fungi; an indication of the age of tree; an indication of the health of root-system; coverage area of root-system; location of tree in regard to solar accessibility; an indication of the type of tree; etc. Next, one or more trees is selected based on the data (802). An intermediate portion of the selected tree between the crown and stump is then removed (803). After removing the intermediate portion, the vascular cambia of the crown and stump are aligned and the remaining crown is grafted to the remaining stump (804), thereby initiating quick regrowth of such tree.

According to an alternative embodiment, rather than attaching a crown and a stump of one tree together, the crown is attached to a stump of a different tree (804A). This may be done for a variety of reasons: better alignment of vascular cambia; compatibility of health characteristics; presence of unwanted fungi, germs, viruses, and bacteria in the would-be stump used for grafting; and/or better location for the grafted tree due to solar accessibility. As such, control system 120 may in some embodiments be configured to store various data about a number of trees (e.g., age, health, tree size, etc.), and suggest matches of crowns and stumps of different trees to optimize the harvesting and grafting processes (e.g., maximize the regrowth potential of the harvested trees, etc.).

According to a further embodiment, method 800 further comprising determining an environmental impact due to the harvesting and grafting. Based on the level of environmental impact, applying for a credit (e.g., carbon credit, etc.) based on that level. This transforms method 800 into an eco-friendly operation likely appealable to many tree harvesters.

Figure 9:
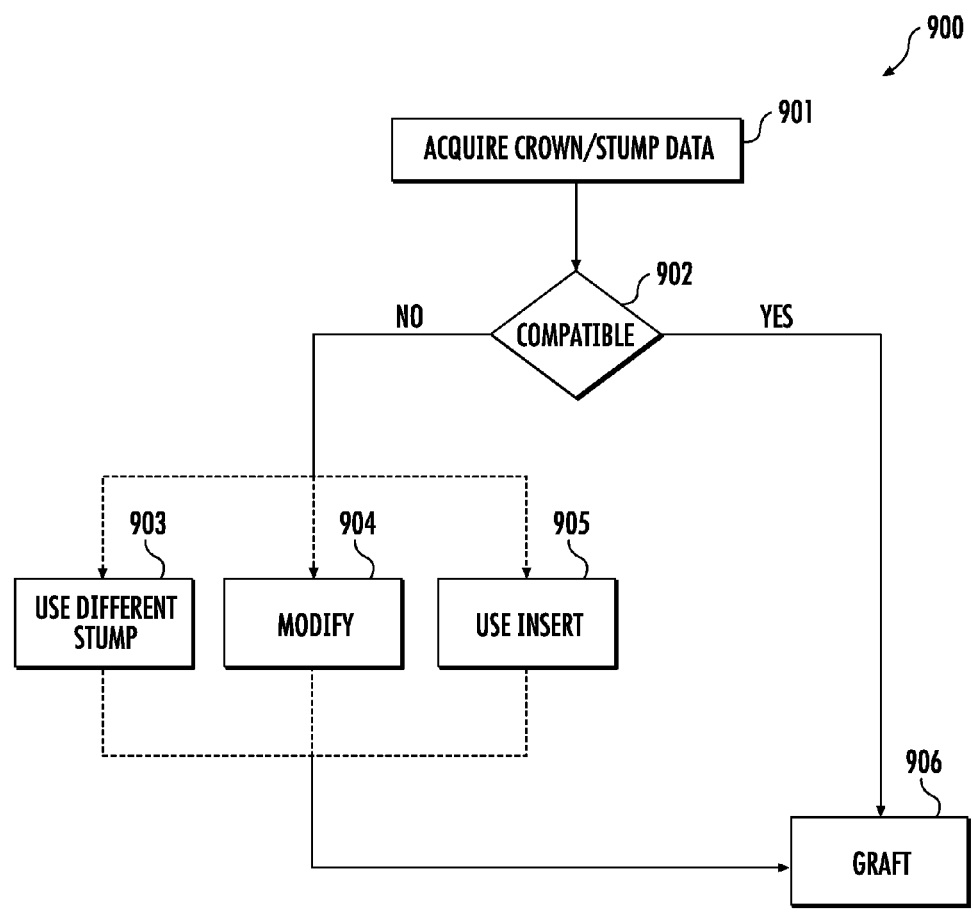
FIG. 9 is a flow diagram illustrating a method of grafting, according to one embodiment.

Referring to FIG. 9, method 900 of grafting a crown to a stump after harvesting an intermediate portion of a tree is shown according to one embodiment. First, data regarding one or more crowns and stumps is acquired using a sensor (901). Sensors can include x-ray, video cameras, microwave, laser, ultrasonic, ultrasound, and lidar devices, transmitters, transceivers, etc. As mentioned above, crown and/or stump data can include the presence of vascular cambia, xylem, and phloem; height and diameter of the crown; height and diameter of the stump; an indication of the health of vascular cambia, xylem, and phloem including presence or absence of bacteria, germs, fungi and viruses; location of vascular cambia; an indication of root-system health; photosynthetic capture area of crown; and an indication of the tree type and age. Based on the data acquired, a control system automatically/robotically determines the compatibility of the crown and stump for grafting (902). In an alternative embodiment, compatibility can be determined based on the judgment of an operator. If the crown and stump are compatible, the crown is grafted to the stump (906). Grafting of the crown to the stump can be accomplished robotically by the control system and harvesting system (described in detail above).

If the stump and crown are not compatible (902), then there are various other options. First, the crown may be compatible with a different stump (903) in which case, the crown and other stump may be grafted (906). Second, reconfiguration/modification of the stump and/or crown may be necessary for successful grafting. As such, the stump and/or crown may be reformed/modified (904) and then grafted together (906). Modifying and grafting may include using a shaper (described above) and removing a section of the crown and/or a portion of the stump in order to align the vascular cambia. In addition, a compactor and/or stretcher (described above) may also be employed to achieve the desired location/orientation of the vascular cambia in the crown and/or stump. Third, if reforming is not done, an insert may be used (and/or generated) (905). The crown and stump can then be grafted together (906). In some embodiments, method 900 further includes applying a sealant to an exposed portion of a joint between the grafted crown and stump to protect against invasion of foreign organisms.

According to an alternative embodiment, prior to grafting (906), any one or a combination of attaching a crown to a stump of a different tree (903), modifying at least one of the crown and stump (904), and using an insert (905) may be employed. As each situation may be different, one or more of the processes may be used to insure alignment of the vascular cambia and compatibility of the crown and stump to achieve a successful tree graft.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on operator choice. All such variations are within the scope of the present disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vehicle for tree harvesting, comprising:
   a body;
   a harvesting system coupled to the body comprising: first and second cutters configured to remove an intermediate portion of a standing tree below a tree crown and above a tree stump; and
   a coupling mechanism configured to apply a fastener to at least one of the tree crown and tree stump, the fastener configured to graft the tree crown to the tree stump; and
   a control system coupled to the body and configured to:
   receive data from the harvesting system regarding a characteristic of the standing tree; and
   control operation of the harvesting system based on the data.

2. The vehicle of claim 1, wherein the control system is further configured to identify the standing tree for harvesting and grafting based on the data.

3. The vehicle of claim 1, wherein the control system is further configured to receive data from the harvesting system regarding a characteristic of the tree stump.

4. The vehicle of claim 1, wherein the first cutter is configured to remove the intermediate portion from the tree crown.

5. The vehicle of claim 4, wherein the second cutter is configured to remove the intermediate portion from a stump of the standing tree.

6. The vehicle of claim 1, wherein the harvesting system includes a sampler configured to acquire the data regarding the characteristic, the characteristic including information regarding at least one of the intermediate portion, the tree crown, and the tree stump.

7. The vehicle of claim 1, wherein the harvesting system further comprises a storage area configured to hold the intermediate portion.

8. The vehicle of claim 7, wherein the harvesting system further comprises a loader configured to deliver the intermediate portion to the storage area.

9. The vehicle of claim 1, wherein the harvesting system further comprises a grabber configured to hold and transport the tree crown.

10. The vehicle of claim 1, wherein the fastener is configured to secure the tree crown to the tree stump in a specific orientation to promote a particular tree regrowth direction.

11. A vehicle for tree harvesting comprising:
a body;
a harvesting system coupled to the body, the harvesting system including first and second cutters and a coupling mechanism configured to apply a fastener; and
a control system coupled to the body and configured to:
receive data from the harvesting system regarding a characteristic of a standing tree; and
control operation of the harvesting system based on the data;
wherein the harvesting system is configured to:
support a crown of the standing tree;
remove, via the first and second cutters, an intermediate portion of the harvested standing tree below the crown;
connect a vascular cambium of the crown to a vascular cambium of a tree stump using an insert while supporting the crown; and
apply the fastener to at least one of the tree crown and tree stump to facilitate grafting of the tree crown to the tree stump.

12. The vehicle of claim 11, wherein the data includes information about at least one of the diameter, an indication of age and health, length, and volume of the intermediate portion.

13. The vehicle of claim 11, wherein the data includes information about at least one of the diameter, length, approximate health, extent of leaf coverage, photosynthetic capture area, and an indication of the presence and health of the vascular cambia, xylem, and phloem of the crown.

14. The vehicle of claim 11, wherein the data includes information about at least one of the presence and health of lateral and primary roots, root hairs, root tip, root cap, beneath ground root-occupied area, a height, a diameter, and an indication of the presence and health of the vascular cambia, xylem, and phloem of the tree stump.

15. The vehicle of claim 11, wherein the harvesting system further includes an implanter configured to implant the insert between the crown and the tree stump.

16. The vehicle of claim 11, wherein the harvesting system is configured to store multiple inserts.

17. The vehicle of claim 16, wherein the multiple inserts are capable of being various sizes.

18. The vehicle of claim 11, wherein the harvesting system further includes a generator coupled to the implanter.

19. The vehicle of claim 18, wherein the generator is configured to at least partially produce the insert.

20. The vehicle of claim 18, wherein the generator comprises a three-dimensional printer configured to print artificial vascular cambia.

21. The vehicle of claim 11, wherein the insert includes a three-dimensional printout of artificial vascular cambia.

22. The vehicle of claim 11, wherein the insert includes a recycled vascular cambia from compatible trees.

23. The vehicle of claim 11, wherein the insert includes artificial cells that produce vascular cambia.

24. The vehicle of claim 11, wherein the insert includes non-artificial cells that produce vascular cambia.

25. A vehicle for tree harvesting comprising:
a body;
a harvesting system coupled to the body, the harvesting system including at least one cutter and a coupling mechanism configured to apply a fastener;
a control system coupled to the body and configured to:
receive data from the harvesting system regarding a characteristic of a standing tree; and
control operation of the harvesting system based on the data;
wherein the harvesting system is configured to:
remove, via the at least one cutter, an intermediate portion of the standing tree below a tree crown;
use a shaper to modify the shape of at least one of the tree crown and a tree stump; and
apply the fastener to at least one of the tree crown and tree stump to graft the tree crown to the tree stump.

26. The vehicle of claim 25, wherein the shaper is configured to remove a portion of at least one of the tree crown and the tree stump.

27. The vehicle of claim 25, wherein the shaper is configured to taper an edge of at least one of the tree crown and the tree stump.

28. The vehicle of claim 25, wherein the harvesting system further includes a stretcher configured to be inserted by the harvesting system.

29. The vehicle of claim 28, wherein the stretcher is configured to increase the diameter of at least one of the tree crown and the tree stump to align a vascular cambium.

30. The vehicle of claim 28, wherein the stretcher is configured to be inserted into the portion removed by the shaper in at least one of the tree crown and the tree stump.

31. The vehicle of claim 25, wherein the harvesting system further includes a compactor configured to be inserted by the harvesting system, the compactor configured to decrease the diameter of at least one of the tree crown and the tree stump to align a vascular cambium of the tree crown to the tree stump.

32. The vehicle of claim 31, wherein the compactor is configured to fit on the outside of at least one of the tree crown and the tree stump.

* * * * *